UNITED STATES PATENT OFFICE.

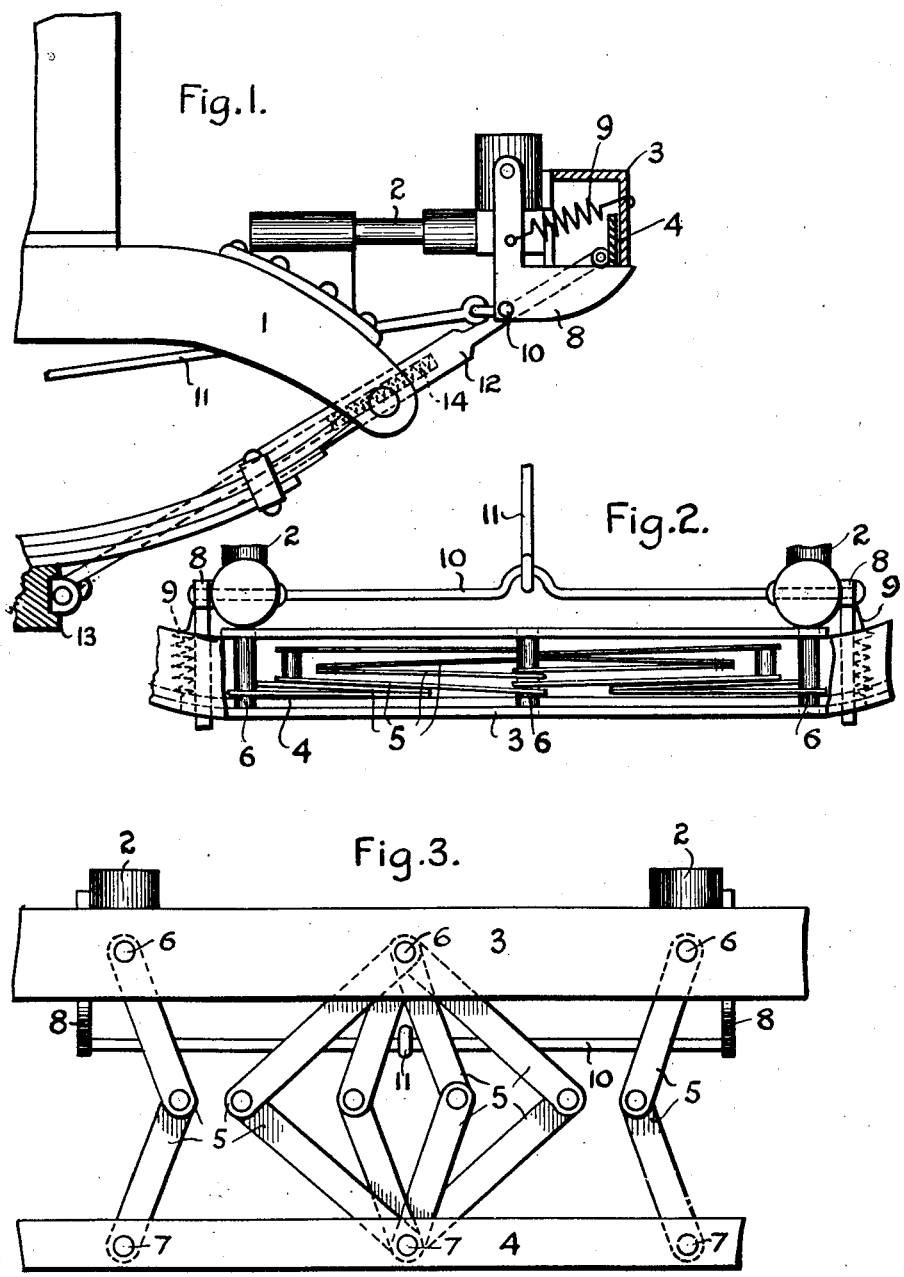

SAMUEL EDWIN HORNE, OF TORONTO, ONTARIO, CANADA.

COMBINED BUMPER AND FENDER FOR AUTOMOBILES.

1,347,699.     Specification of Letters Patent.   Patented July 27, 1920.

Application filed August 22, 1919. Serial No. 319,210.

*To all whom it may concern:*

Be it known that I, SAMUEL EDWIN HORNE, a subject of the King of Great Britain, residing at the city of Toronto, in the county of York, in the Province of Ontario, Canada, have invented certain new and useful Improvements in Combined Bumpers and Fenders for Automobiles, of which the following is a specification.

My invention relates to improvements in combined bumpers and fenders for automobiles, and the object of the invention is to devise a combined bumper and fender, which will be normally in the bumper position and which can be readily lowered into the fender position when required.

My invention consists of a bumper member suitably secured to the front of the automobile, a fender member secured to the bumper member by hinged plates and spring-held catches for normally holding the fender member in the up or inoperative position, all as hereinafter more particularly described and illustrated in the accompanying drawing in which:—

Figure 1, represents a side elevation of the fore part of the car, showing my invention applied thereto.

Fig. 2, is a plan view of my combined bumper and fender and

Fig. 3, is a front elevation thereof.

Like characters of reference indicate corresponding parts in the different views.

1 are the forks of the chassis frame. 2 are brackets secured to the forks for supporting the bumper member 3, which is, preferably, constructed of angle iron form. 4 is the fender member attached to the bumper member by centrally hinged plates 5, said plates being pivotally connected to the bumper and fender members by the screws 6 and 7 respectively. 8 are catches pivotally connected to the brackets 2 and adapted to engage the bottom edge of the fender member 4. 9 are springs for holding the catches in such engagement. 10 is the rod extending between the two catches and 11 is a control rod by means of which the catch can be actuated from the dashboard of the vehicle. 12 is an adjustable distance rod pivotally connected at one end to the fender member 4 and at the other end to the front axle 13. This distance rod stiffens the fender member in its impact with an object, but owing to the fact that it is collapsible within the limits of the spring 14 it helps to absorb the shock.

It will be seen that the fender member can readily be lowered when the occasion demands by pulling back the catches 8 by the control rod 11. This will disengage the catches and allow the fender member to drop into the operative position.

What I claim as my invention is:

The combination with the forward end of a vehicle frame, of a pair of forwardly directed brackets secured to said frame, a resiliently projected casing constituting a bumper supported upon said brackets and having the lower portion thereof open, a foldable fender secured in said casing and arranged to be completely contained therein when in folded form, a pair of substantially L-shaped catches having the vertical arms thereof pivoted to the brackets and the horizontal arms thereof normally disposed beneath the open portion of the casing to support the folded fender therein, a connecting rod extending between said catches below the pivots thereof, springs engaged with said catches and normally holding the same in fender supporting position, and means for swinging said catches to fender releasing position including a control rod attached to said connecting rod.

SAMUEL EDWIN HORNE.